US006650511B2

(12) United States Patent
Hsiao et al.

(10) Patent No.: US 6,650,511 B2
(45) Date of Patent: Nov. 18, 2003

(54) MAGNETIC HEAD ASSEMBLY WITH ELECTROSTATIC DISCHARGE (ESD) SHUNT/PADS SEED LAYER

(75) Inventors: Richard Hsiao, San Jose, CA (US); James Devereaux Jarratt, San Jose, CA (US); Chie Ching Poon, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 66 days.

(21) Appl. No.: 10/074,504

(22) Filed: Feb. 11, 2002

(65) Prior Publication Data

US 2003/0151858 A1 Aug. 14, 2003

(51) Int. Cl.[7] .............................. G11B 5/39; G11B 5/40

(52) U.S. Cl. ....................................................... 360/323

(58) Field of Search ................................ 360/317, 322, 360/323, 324, 128

(56) References Cited

U.S. PATENT DOCUMENTS 5,272,582 A 12/1993 Shibata et al. .............. 360/113
5,465,186 A 11/1995 Bajorek et al. ............. 360/113
5,491,605 A 2/1996 Hughbanks et al. ........ 360/113
5,748,412 A 5/1998 Murdock et al. ........... 360/113
5,757,590 A * 5/1998 Phipps et al. ............... 360/323
5,759,428 A 6/1998 Balamane et al. ..... 219/121.66
5,805,390 A 9/1998 Takeura ...................... 360/113
5,978,181 A * 11/1999 Niijima et al. .............. 360/323
6,054,330 A * 4/2000 Phipps et al. .................. 438/3
6,067,220 A 5/2000 Ahmann et al. ............ 361/111
6,125,015 A 9/2000 Carlson et al. .......... 360/245.9
6,160,688 A 12/2000 Okumura ..................... 360/323
6,163,437 A * 12/2000 Inage et al. ................. 360/128
6,219,206 B1 * 4/2001 Odai et al. .................. 360/320
6,267,903 B1 * 7/2001 Watanuki ..................... 216/22
6,470,566 B2 * 10/2002 Hsiao et al. ............. 29/603.13
6,507,466 B1 * 1/2003 Hayashi et al. ............. 360/323
2001/0043446 A1 * 11/2001 Barlow et al. .............. 360/319
2002/0044392 A1 * 4/2002 Bougtaghou et al. ....... 360/323
2002/0063361 A1 * 5/2002 Fahey ........................ 264/400

FOREIGN PATENT DOCUMENTS

JP 11242809 9/1999
JP 2000322715 11/2000

OTHER PUBLICATIONS

*IBM Technical Disclosure Bulletin*, vol. 24, No. 6, Nov. 1981, "Protected High–Density MR Head".
*IBM Technical Disclosure Bulletin*, vol. 39, No. 2, Feb. 1996, "Magneto Resistive–Sensor Protection on Wafer Level".

* cited by examiner

*Primary Examiner*—Jefferson Evans
(74) *Attorney, Agent, or Firm*—Ervin F. Johnston

(57) ABSTRACT

A multi-layer electrically conductive shunt is located on the exterior surface of a slider in electrical contact and extending between first and second lead ends of leads that are connected to a sensor of a read head. Electrically conductive spaced apart first and second read pads are located on the conductive shunt in electrical contact with the first and second lead ends via the conductive shunt. The conductive shunt includes a thick gold layer which is located between and interfaces an adhesion layer and a cap layer wherein the adhesion layer makes direct electrical contact with the aforementioned first and second lead ends.

35 Claims, 14 Drawing Sheets

(ABS)

MAGNETIC HEAD ASSEMBLY WITH ELECTROSTATIC DISCHARGE (ESD) SHUNT/PADS SEED LAYER

BACKGROUND OF THE INVENTION

1. Field of the Invention

The present invention relates to a magnetic head assembly with electrostatic discharge (ESD) shunt/pads seed layer and, more particularly, to a highly conductive multi-layer seed layer on a slider which serves as a seed layer for exposed electrical pads on the slider and can be patterned to provide a shunt between read pads thereof.

2. Description of the Related Art

The heart of a computer is a magnetic disk drive which includes a rotating magnetic disk, a slider that has read and write heads, a suspension arm above the rotating disk and an actuator arm that swings the suspension arm to place the read and write heads over selected circular tracks on the rotating disk. The suspension arm urges the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic field signals from the rotating disk. The read and write heads are connected to processing circuitry that operates according to a computer program to implement the writing and reading functions.

An exemplary high performance read head employs a spin valve sensor for sensing the magnetic signal fields from the rotating magnetic disk. The sensor includes a nonmagnetic electrically conductive first spacer layer sandwiched between a ferromagnetic pinned layer structure and a ferromagnetic free layer structure. An antiferromagnetic pinning layer interfaces the pinned layer structure for pinning a magnetic moment of the pinned layer structure 90° to an air bearing surface (ABS) wherein the ABS is an exposed surface of the sensor that faces the magnetic disk. First and second leads are connected to the spin valve sensor for conducting a sense current therethrough.

In addition to the spin valve sensor the read head includes nonmagnetic electrically nonconductive first and second read gap layers and ferromagnetic first and second shield layers. The spin valve sensor is located between the first and second read gap layers and the first and second read gap layers are located between the first and second shield layers. In the construction of the read head the first shield layer is formed first followed by formation of the first read gap layer, the spin valve sensor, the second read gap layer and the second shield layer.

First and second leads are connected to the read sensor and extend therefrom between the first and second read gap layers and beyond the gap layers inside the slider to first and second lead ends which are located at an exterior surface of the slider. Third and fourth leads are connected across the write head and extend within the slider to spaced apart third and fourth lead ends at the exterior surface of the slider. First, second, third and fourth electrical pads are connected to the first, second, third and fourth lead ends for further connection to additional leads which connect the read and write heads to the aforementioned processing circuitry. During construction and assembly of the slider and the read and write heads, the sensor of the read head must be protected from electrostatic discharge (ESD) since the read sensor is a very small conductive element. The risk of damage to the write coil due to ESD is much less since it is a much larger conductive element. A discharge with only a few volts between the spaced apart first and second read pads can destroy or severely damage the read sensor. Such a discharge can occur by contact with or close proximity to a person, plastic involved in fabrication or components of the magnetic disk drive.

A typical arrangement for protecting the read sensor from ESD is to interconnect the first and second read pads with a thin film conductive line (shunt) on the exterior surface of the slider. This shorts the read circuit, preventing a discharge there across. The best time during assembly to form the conductive shunt between the pads is at the wafer level.

Magnetic heads are typically formed in rows and columns on the wafer which may be aluminum oxide/titanium carbide ($Al_2O_3$/TiC). At the wafer level the conductive shunts are formed between the read pads for shorting the read sensors. After formation of the magnetic heads the wafer is cut into rows. Each row is then cut into individual heads with a portion of the wafer serving as a slider for supporting the magnetic heads. Each slider with the heads mounted thereon is mounted on a head gimbal assembly (HGA) which, in turn, is mounted on a suspension which, in turn, is mounted on an actuator arm. A plurality of actuator arms may then be mounted in an actuator assembly to form a head stack assembly (HSA). From the time of forming the conductive shunts up to the time of forming the HSA the read sensors are protected from ESD. The next step is to merge the HSA with a disk stack assembly to form a complete disk drive which step is referred to in the art as "merge". The most practical time to sever the conductive shunt of each read head so that the read head becomes operational is just before merge. This severing is typically done by a laser beam.

The slider material has very low electrical conductivity and therefore cannot function as a seed layer for plating the pads of the conductive shunt (if plated). A conductive seed layer, typically sputtered, is employed for plating the pads and to act as the whole or part of the conductive shunt. The slider typically has an overcoat of aluminum oxide ($Al_2O_3$) at the location of the pads and the conductive shunt. Gold (Au) is a desirable material for the conductive shunt but has very poor adhesion to the aluminum oxide overcoat. Also, adhesion between patterning resist and gold is poor.

SUMMARY OF THE INVENTION

The present invention provides a multi-layer seed layer on the exterior surface of the slider which can be employed for making the aforementioned pads and, after making the pads, can be patterned to form a conductive shunt between the first and second read pads. The conductive shunt has an electrically conductive adhesion layer which interfaces the surface of the slider and an electrically conductive layer, which is preferably gold (Au), with the adhesion layer being located between the slider and the conductive layer. A preferred adhesion layer is tantalum (Ta) or chromium (Cr). The conductive shunt preferably includes a cap layer with the conductive layer being located between the adhesion layer and the cap layer. The cap layer is preferably nickel iron chromium (NiFeCr) or rhodium (Rh).

An object of the present invention is to provide a magnetic head assembly with a seed layer on the surface of a slider which can be used for electroplating read and write pads followed by patterning of the seed layer to form a conductive shunt between first and second read pads.

Another object is to provide the seed layer of the previous object with multi-layers to provide good adhesion to the slider as well as providing high electrical conductivity and, after protecting the read head from ESD, can be easily severed with a laser.

A further object is to provide a method of making the foregoing read heads.

Other objects and attendant advantages of the invention will be appreciated upon reading the following description taken together with the accompanying drawings.

DESCRIPTION OF THE PREFERRED EMBODIMENTS

Magnetic Disk Drive

Figure 1:
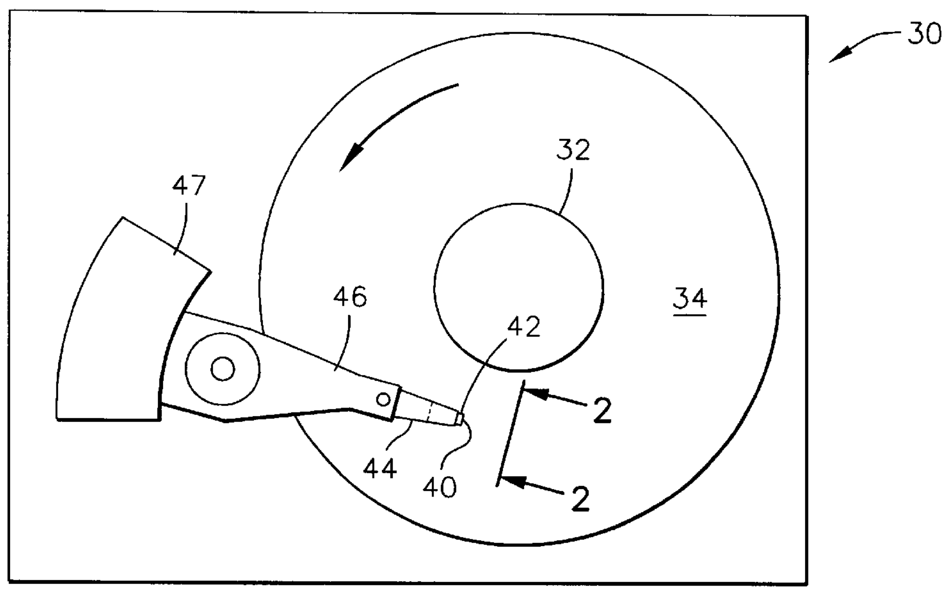
FIG. 1 is a plan view of an exemplary prior art magnetic disk drive.
Figure 2:
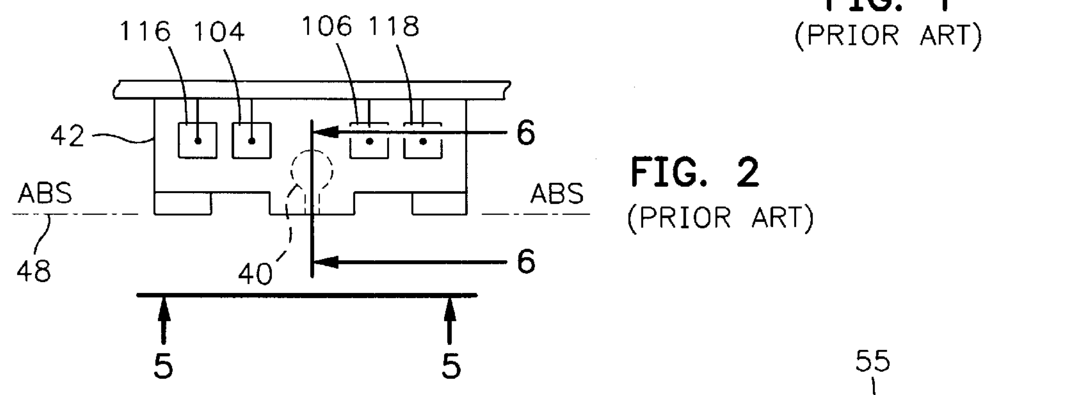
FIG. 2 is an end view of a prior art slider with a magnetic head of the disk drive as seen in plane 2—2 of FIG. 1.
Figure 3:
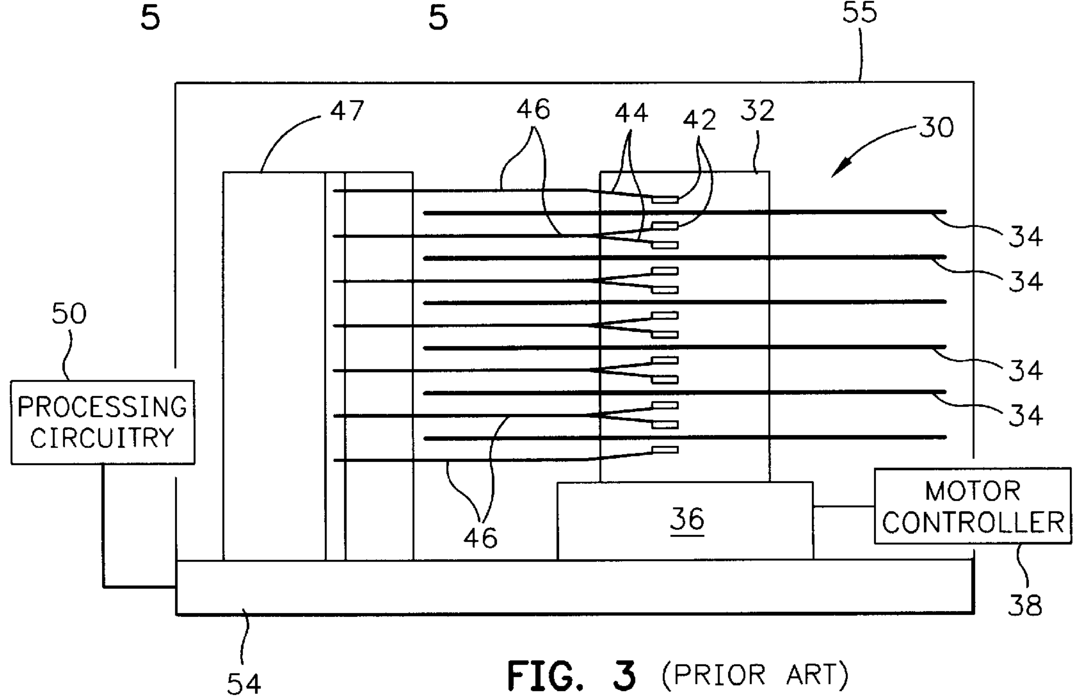
FIG. 3 is an elevation view of the prior art magnetic disk drive wherein multiple disks and magnetic heads are employed.
Figure 4:
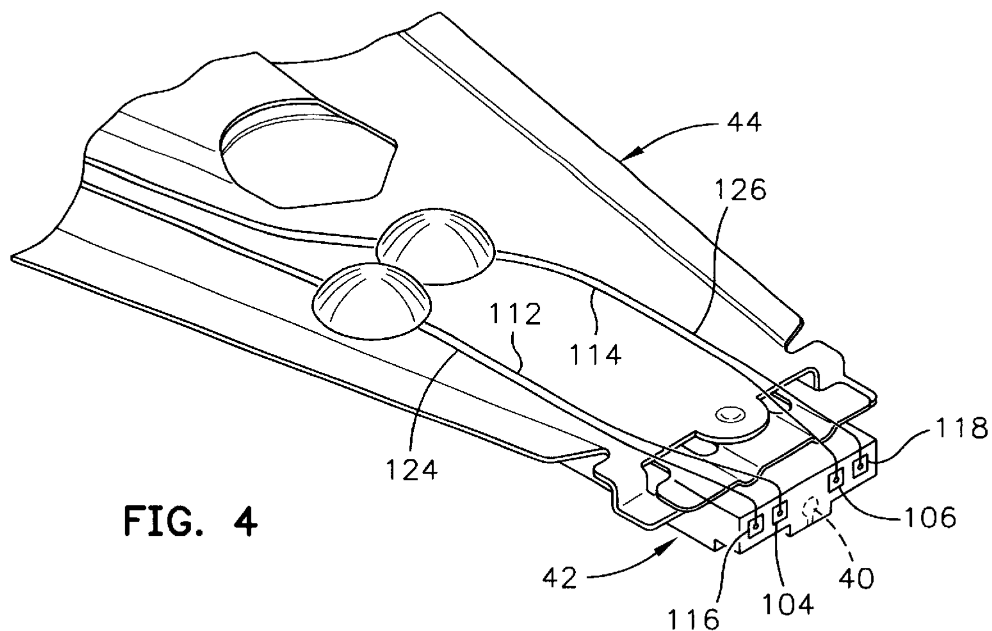
FIG. 4 is an isometric illustration of an exemplary prior art suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a spindle motor 36 that is controlled by a motor controller 38. A slider 42 has a combined read and write magnetic head assembly 40 and is supported by a suspension 44 and actuator arm 46 that is rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head assembly 40 is in a transducing relationship with a surface of the magnetic disk 34. When the disk 34 is rotated by the spindle motor 36 the slider is supported on a thin (typically, 0.01 $\mu$m) cushion of air (air bearing) between the surface of the disk 34 and the air bearing surface (ABS) 48. The magnetic head assembly 40 may then be employed for writing information to multiple circular tracks on the surface of the disk 34, as well as for reading information therefrom. Processing circuitry 50 exchanges signals, representing such information, with the magnetic head assembly 40, provides spindle motor drive signals for rotating the magnetic disk 34, and provides control signals to the actuator for moving the slider to various tracks. In FIG. 4 the slider 42 is shown mounted to a suspension 44. The components described hereinabove may be mounted on a frame 54 of a: housing 55, as shown in FIG. 3.

Figure 5:
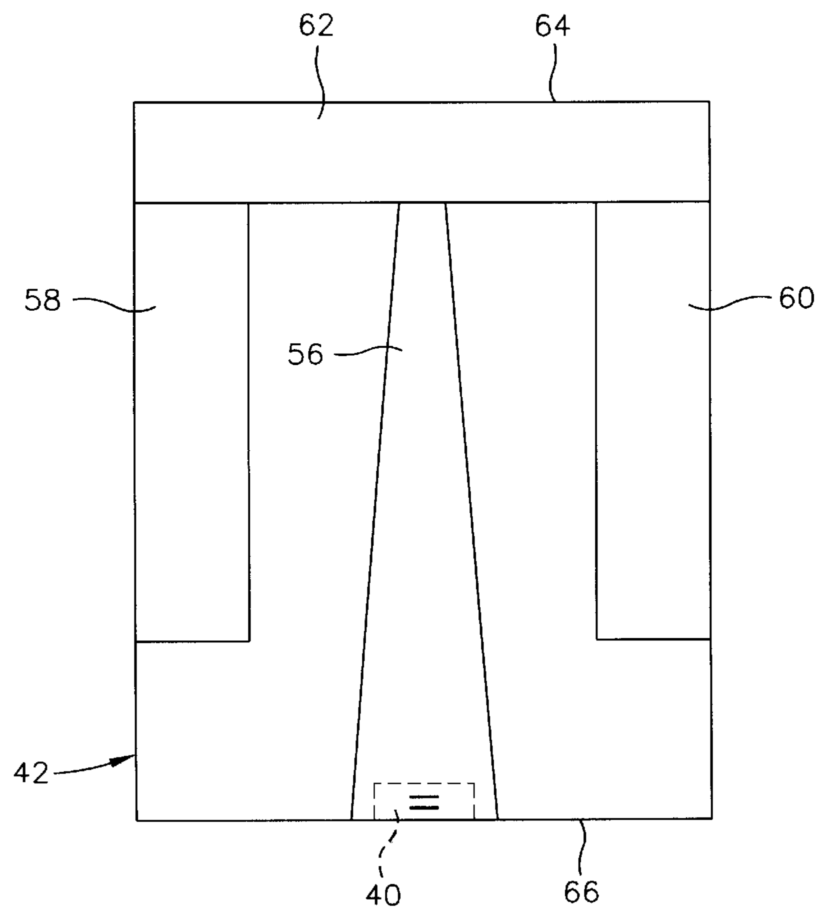
FIG. 5 is an ABS view of the magnetic head taken along plane 5—5 of FIG. 2.

FIG. 5 is an ABS view of the slider 42 and the magnetic head assembly 40. The slider has a center rail 56 that supports the magnetic head assembly 40, and side a rails 58 and 60. The rails 56, 58 and 60 extend from a cross rail 62. With respect to rotation of the magnetic disk 34, the cross rail 62 is at a leading edge 64 of the slider and the magnetic head assembly 40 is at a trailing edge 66 of the slider.

Figure 6:
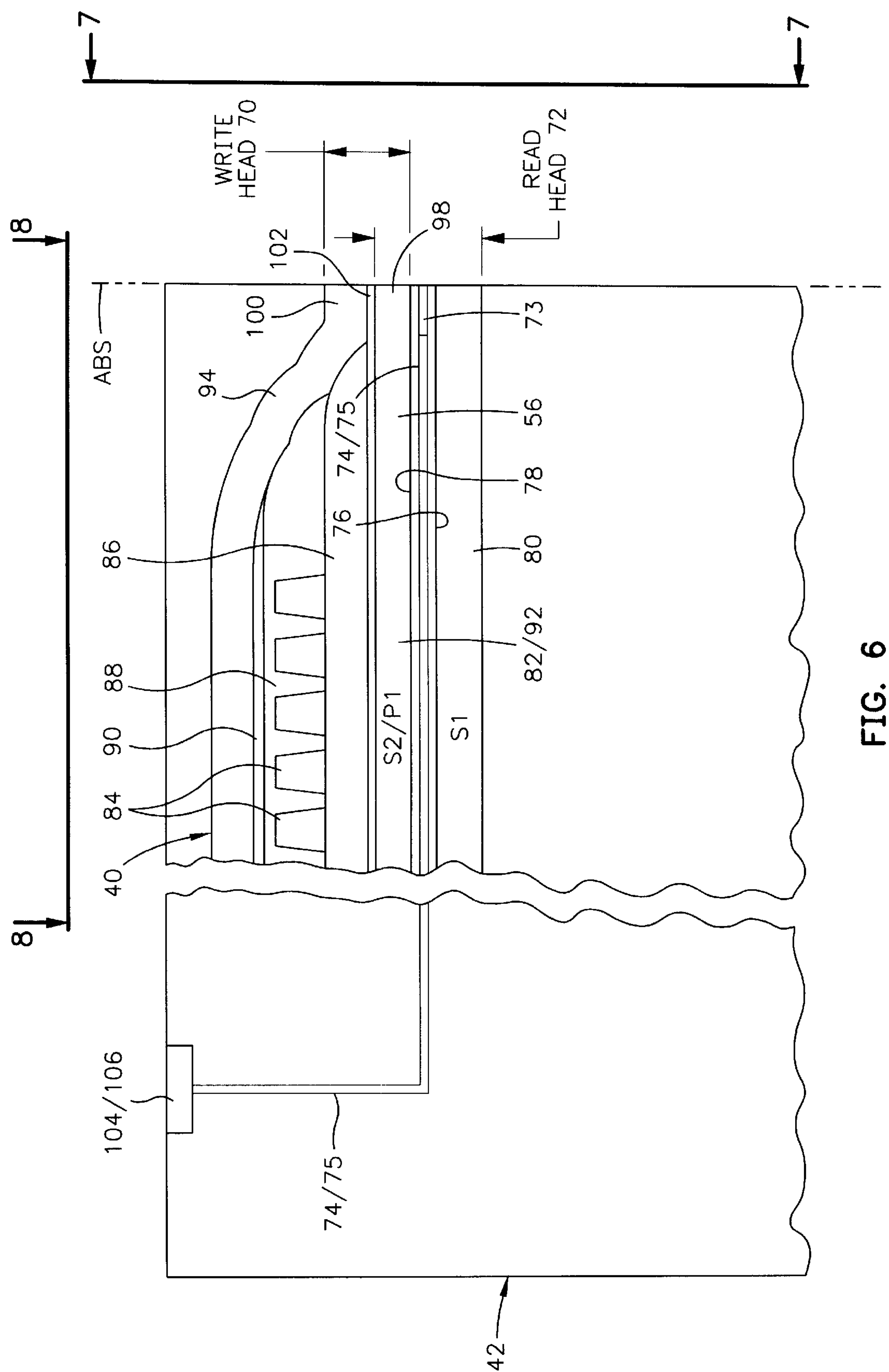
FIG. 6 is a partial view of the slider and the present write head as seen in plane 6—6 of FIG. 2.
Figure 7:
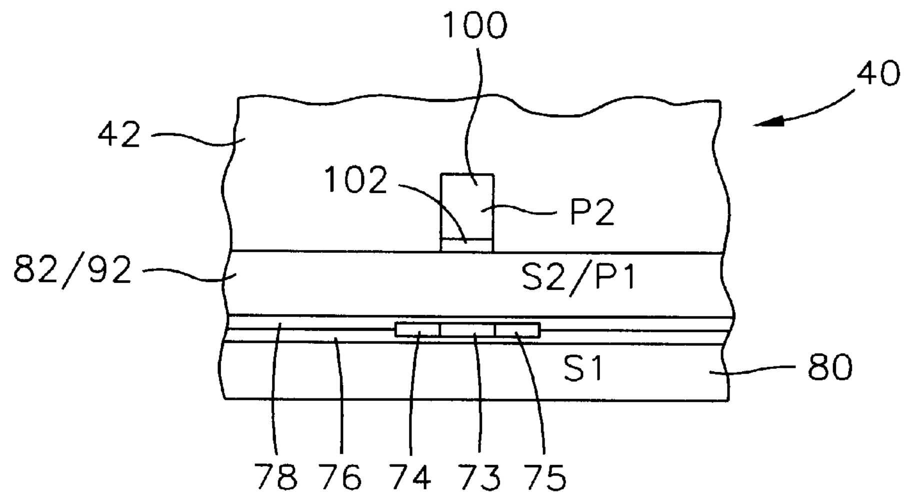
FIG. 7 is a partial ABS view of the slider taken along plane 7—7 of FIG. 6 to show the read and write elements of the magnetic head.

FIGS. 6 and 7 show the merged magnetic head assembly 40, which includes a write head portion 70 and a read head portion 72, the read head portion employing a read sensor, such as a spin valve sensor 73. First and second leads 74 and 75 are connected to the sensor. The sensor 73 and the leads 74 and 75 are sandwiched between nonmagnetic electrically nonconductive first and second read gap layers 76 and 78, and the read gap layers are sandwiched between ferromagnetic first and second shield layers (S1 and S2) 80 and 82. In response to external magnetic fields, the resistance of the sensor 73 changes. A sense current conducted through the sensor via the leads 74 and 75 causes these resistance changes to be manifested as potential changes. These potential changes are then processed as readback signals by the processing circuitry 50 shown in FIG. 3.

The write head portion 70 of the magnetic head assembly 40 includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap (not shown) and have first and second pole tips 98 and 100 which are separated by a write gap layer 102 at the ABS. Since the second shield layer 82 and the first pole piece layer 92 are a common layer this head is known as a merged head. In a piggyback head the second shield layer and the first pole piece layer are separate layers which are separated by a nonmagnetic layer. As shown in FIGS. 2 and 4, first and second pads 104 and

Figure 8:
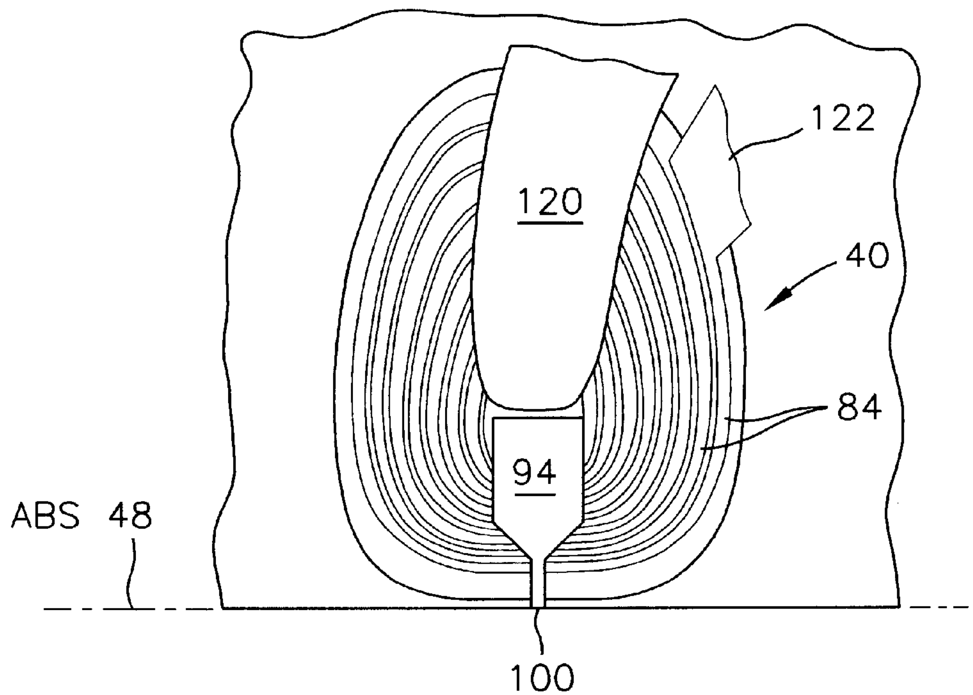
FIG. 8 is a view taken along plane 8—8 of FIG. 6 with all material above the coil layer and leads removed.

106 connect the leads 74 and 75 from the spin valve sensor 73 (shown in FIG. 9) to leads 112 and 114 on the suspension 44 (shown in FIG. 4), and third and fourth pads 116 and 118 connect leads 120 and 122 from the coil 84 (see FIG. 8) to leads 124 and 126 on the suspension.

Figure 9:
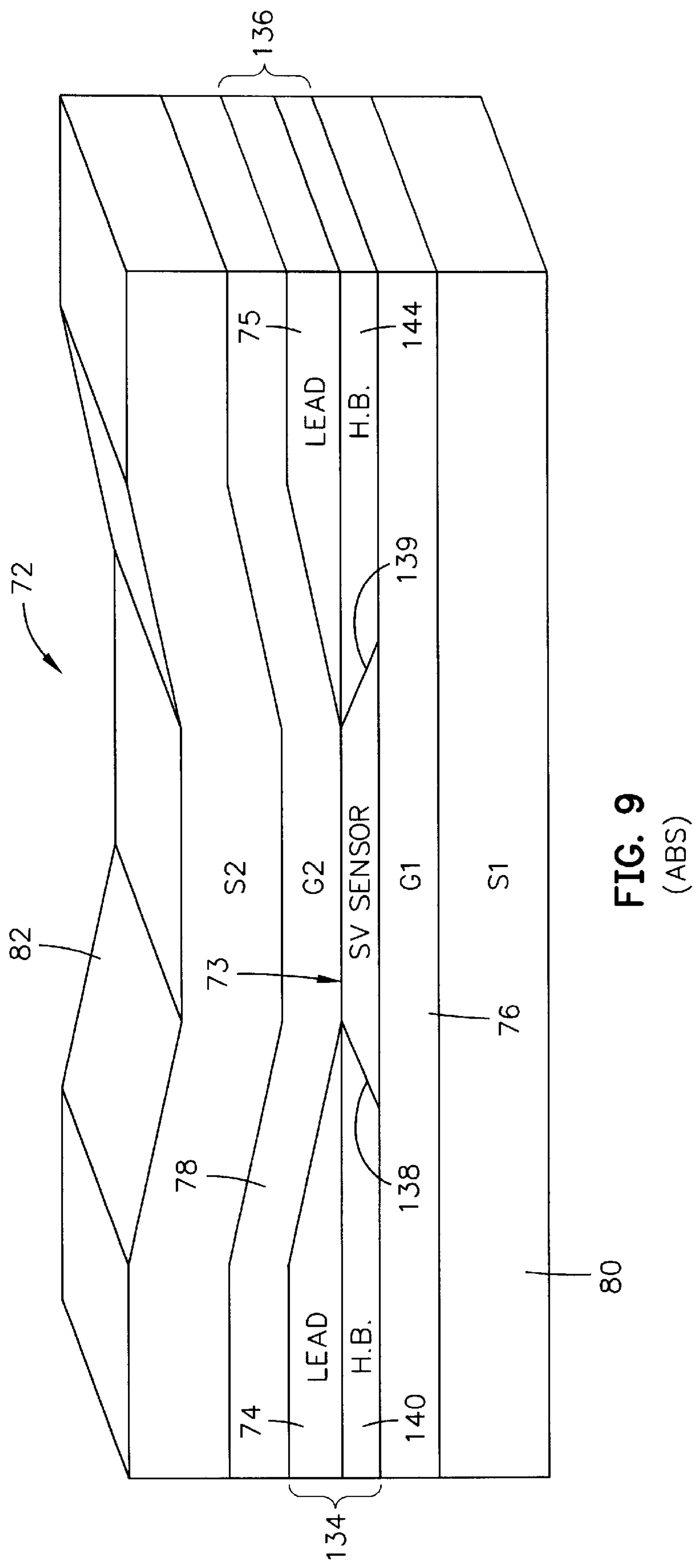
FIG. 9 is an enlarged ABS illustration of the read head.

FIG. 9 is an isometric ABS illustration of the read head 40 shown in FIG. 6. First and second hard bias and lead layers 134 and 136 are connected to first and second side surfaces 138 and 139 of the spin valve sensor. This connection is known in the art as a contiguous junction and is fully described in commonly assigned U.S. Pat. No. 5,018,037. The first hard bias and lead layers 134 include a first hard bias layer H.B. 140 and the first lead layer 74 and the second hard bias and lead layers 136 include a second hard bias layer H.B. 144 and the second lead layer 75. The hard bias layers 140 and 144 cause magnetic fields to extend longitudinally through the spin valve sensor 73 for stabilizing the magnetic domains therein. The spin valve sensor 73 and the first and second hard bias and lead layers 134 and 136 are located between the first and second read gap layers 76 and 78 and the first and second read gap layers 76 and 78 are, in turn, located between the ferromagnetic first and second shield layers 80 and 82.

The Invention

Figure 10:
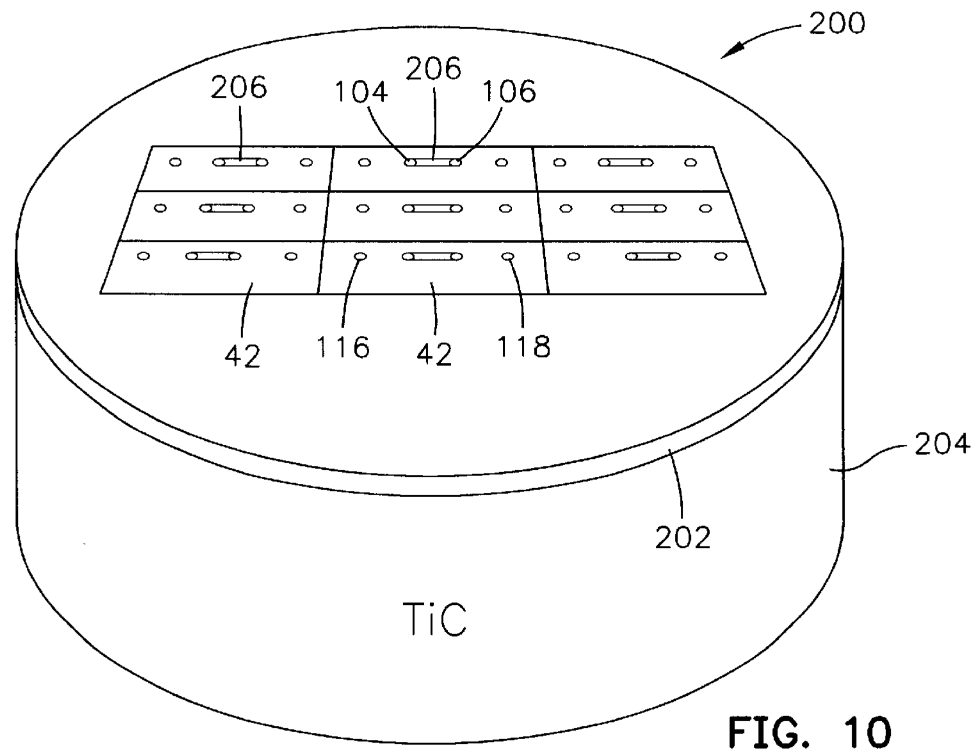
FIG. 10 is an isometric illustration of a wafer with rows and columns of magnetic head assemblies constructed thereon.

FIG. 10 shows a wafer 200 where multiple layers 202 have been deposited upon a substrate 204, such as aluminum oxide/titanium carbide ($Al_2O_3$/TiC), to make rows and columns of sliders 42. Each slider has first and second read pads 104 and 106 and first and second write pads 116 and 118. A conductive shunt 206 extends between each of the first and second read pads 104 and 106. A top layer of the layers 202 is typically an overcoat layer (not shown) of aluminum oxide ($Al_2O_3$), which is immediately below the read and write pads and the conductive shunts.

Figure 11:
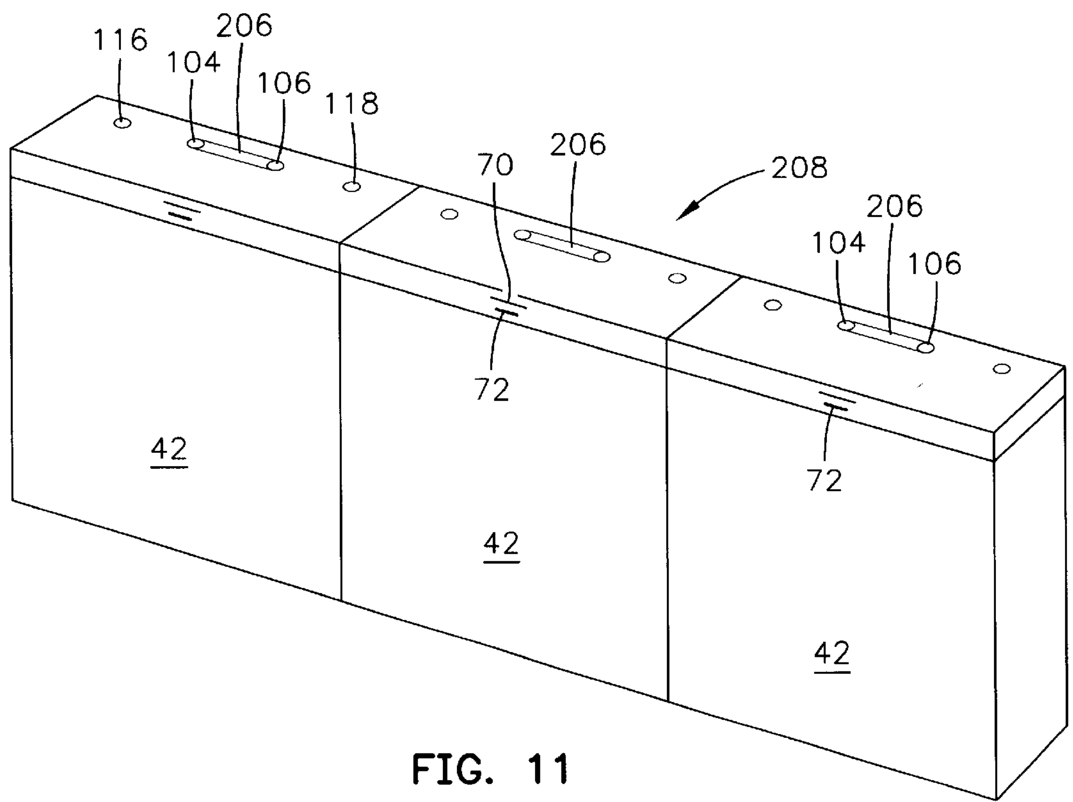
FIG. 11 is a row of slider and magnetic head assemblies after cutting from the wafer in FIG. 10.
Figure 12:
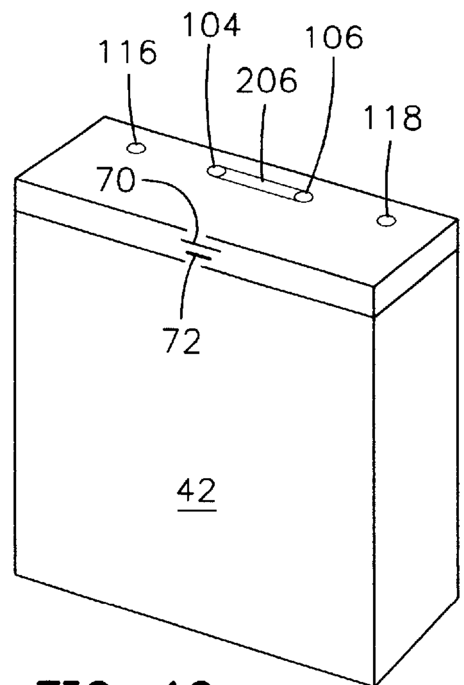
FIG. 12 is a single slider and magnetic head assembly after cutting from the row shown in FIG. 11.
Figure 16:
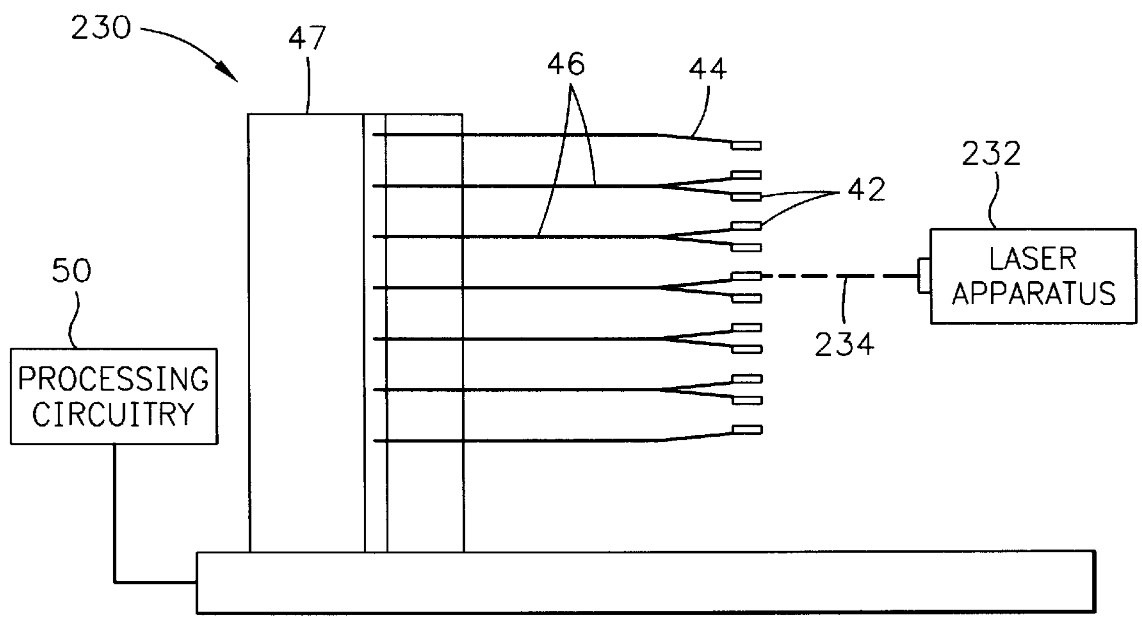
FIG. 16 is a schematic illustration of a head stack assembly (HSA) where a laser apparatus is severing a conductive shunt on one of the sliders.

FIG. 11 shows a row 208 of sliders 42 after the row 208 is diced (cut) from the wafer 200 in FIG. 10. After lapping (grinding) the write and read heads 70 and 72 are exposed at the ABS. FIG. 12 is an individual slider 42 after being diced from the row 208 of sliders in FIG. 11. Slider 42 is then mounted on a head gimbal assembly (HGA) of the suspension 44 in FIG. 4. Numerous suspensions may be then mounted on a head stack assembly (HSA), as shown in FIG. 16, and then the head stack assembly may be merged with the disk stack 32 and 34, as shown in FIG. 3, which is referred to in the art as merge. From the time of construction of the read heads at the wafer level in FIG. 10 to the time of merge the conductive shunts 206 short the read circuit so as to protect the delicate read sensor 73 from damage due to electrostatic discharge (ESD).

Figure 13:
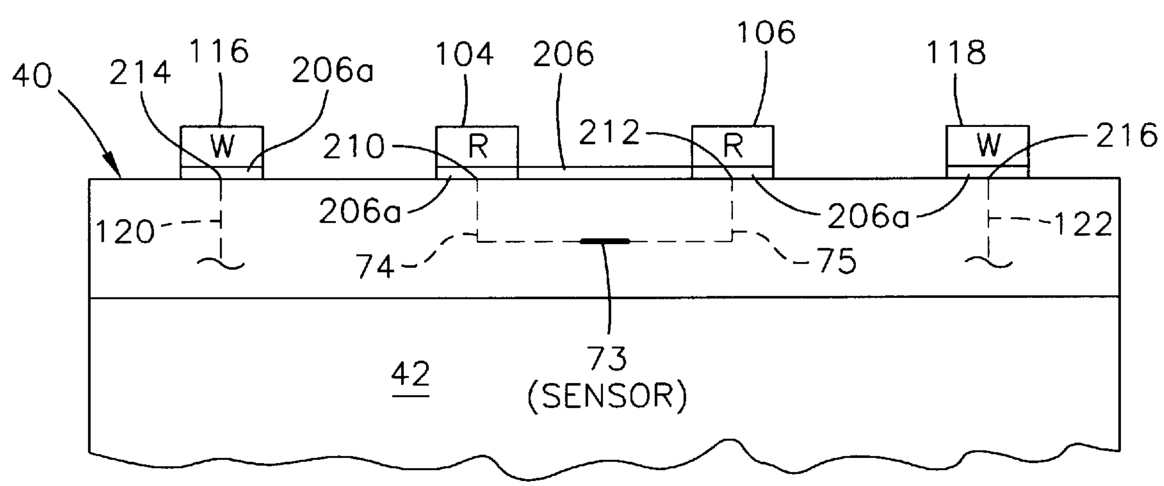
FIG. 13 is a side view of a top portion of the slider with read and write pads and a conductive shunt between the read pads.

FIG. 13 shows a side view of a top portion of the slider with the first and second write pads 116 and 118 and the conductive shunt 206 extending in between the first and second read pads 104 and 106. The first and second leads 74 and 75 extend from the sensor 73 and terminate in first and second lead ends 210 and 212 at a top surface of the slider. Multi-layer seed layers **206*a* are located between each of the read and write pads and the top surface of the slider. The conductive shunt 206 is an extension of the seed layers 206*a* below the first and second read pads 210 and 212 and formed by a method described hereinbelow. The seed layers 206*a* below the read pads make electrical connection with the lead ends 210 and 212, make connection with the first and second read pads 210 and 212 and make electrical connection with the conductive shunt 206. The first and second write leads 120 and 122 terminate in lead ends 214 and 216. The seed layer 206*a* on the left side makes electrical connection with the lead end 214 and the write pad 116 and the seed layer 206*a* on the right side makes electrical connection with the lead end 216 and the write pad 118**.

Figure 14:
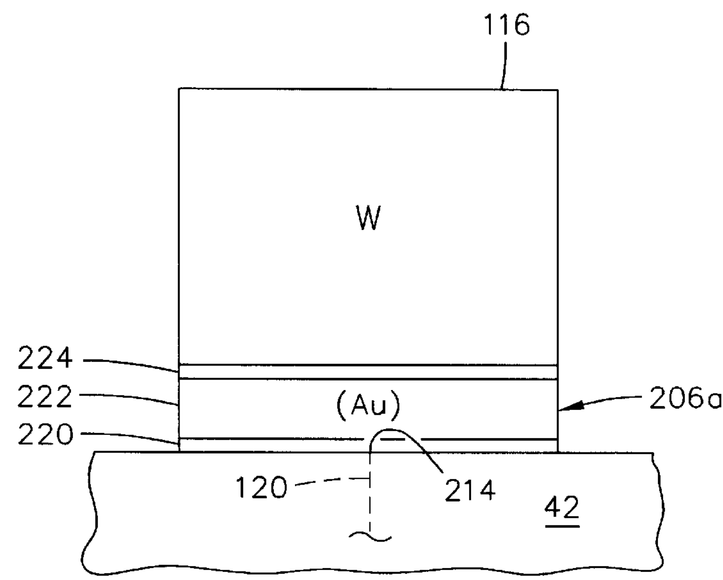
FIG. 14 is an enlarged side illustration of one of the write pads with a trilayer seed layer between the top of the slider and the write pad.
Figure 15:
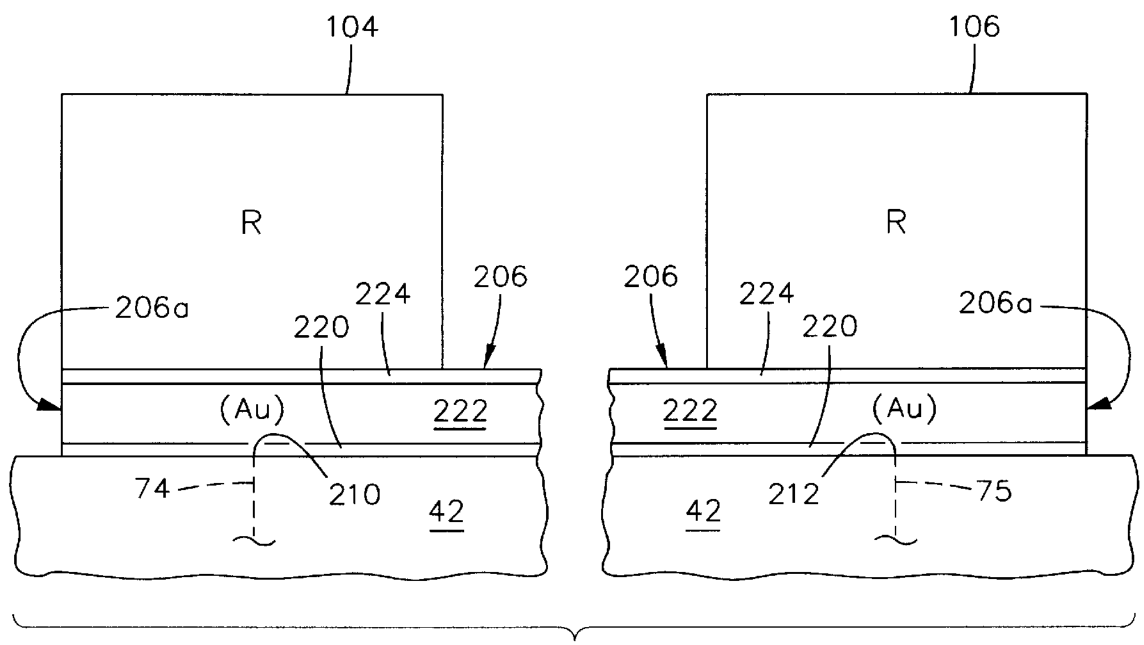
FIG. 15 illustrates a pair of read pads with the trilayer seed layer located between the read pads and the slider and also forming a conductive shunt between the read pads.

FIG. 14 is an enlarged side view of the write pad 116 shown in FIG. 13 and FIG. 15 is an enlarged view of the read pads 104 and 106 in FIG. 13 with a middle portion of the slider 42 and conductive shunt 206 broken therebetween. The seed layer **206*a* in FIG. 14 is multi-layered and includes an adhesion layer 220 and a conductive layer 222 with the adhesion layer 220 being located between and interfacing the top of the slider, which is typically composed of aluminum oxide ($Al_2O_3$), and the conductive layer 222. In a preferred embodiment the seed layer 206*a* also includes a cap layer 224 which is located between the conductive layer 222 and the write pad 116. The write pad 116, as well as the other pads, is preferably gold (Au). It can be seen from FIG. 15 that the conductive shunt 206 between the read pads 104 and 106 and the seed layers 206*a* below the read pads 104 and 106 comprise the same layers 220, 222 and 224, as described in FIG. 14**.

In a preferred embodiment the adhesion layer 220 is tantalum (Ta) or chromium (Cr) and the conductive layer 222 is gold (Au). Each of the metals, tantalum, chromium and gold, are non-anisotropic magnetoresistive (non-AMR) so as not to affect the magnetic stability of the read sensor 73. Tantalum or chromium has been further selected as the adhesion layer because it has far greater adhesion to the aluminum oxide ($Al_2O_3$) at the top of the slider than gold (Au). Gold (Au) is selected because of its high conductivity which is higher than the materials for the adhesion and cap layers. In a preferred embodiment the cap layer is nickel iron chromium (NiFeCr) or rhodium (Rh) which is slightly AMR but is very thin so as to have no serious impact on the read sensor. The materials for each of the layers 220, 222 and 224 have been further selected so that they can readily be severed with a laser beam. Preferred ranges of the thicknesses of the layers are 100 Å–1,000 Å for the adhesion layer 220, 300 Å–20,000 Å for the conductive layer 222 and 100 Å–1,000 Å for the cap layer 224. Optional materials for either the adhesion layer 220 or the cap layer 224 are NiFeX where X=Cr, Rh or Ta. The element X is used to diminish the AMR effect of the NiFe film. The cap layer 224 protects the gold layer 222 from mechanical scratching and damage during various process steps. The capping layer 224 has also been selected because it adheres to photoresist which is used for patterning. Adhesion is not good if the photoresist interfaces the gold layer 222.

Figure 17:
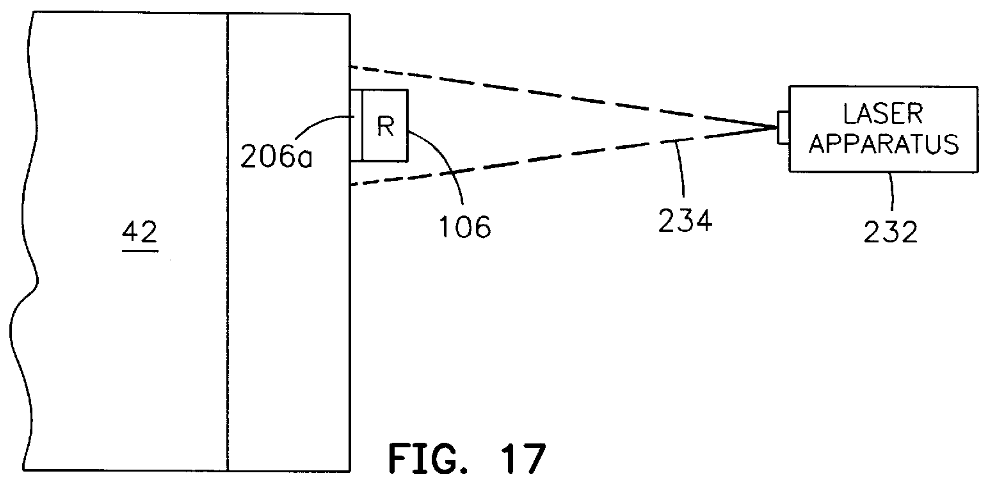
FIG. 17 is an enlarged illustration of the laser severing shown in FIG. 16.
Figure 18:
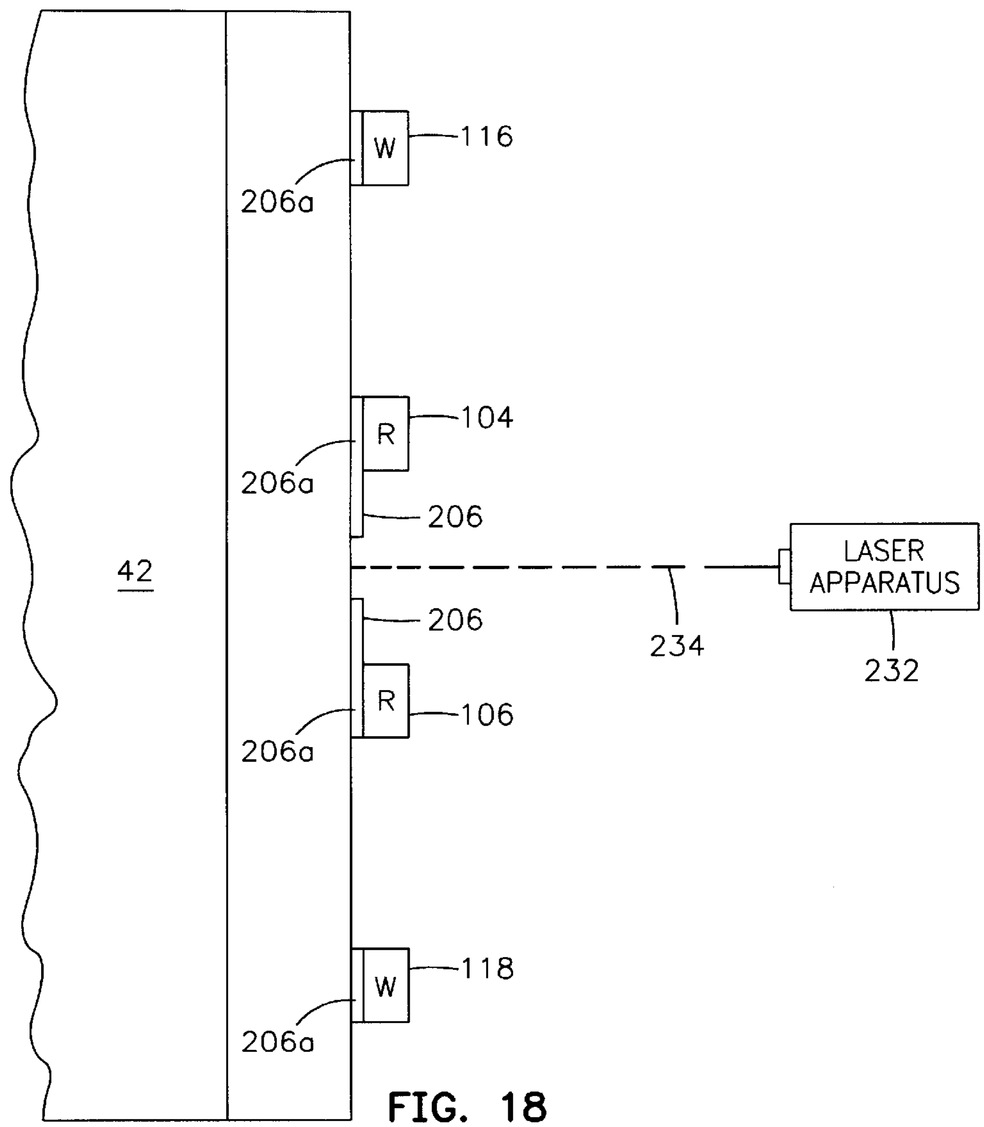
FIG. 18 is a top view of FIG. 17.

FIG. 16 shows a side view of a head stack assembly (HSA) 230 before the head stack assembly has been merged with the disk stack assembly 32 and 34 of FIG. 3. A laser apparatus 232 is shown directing a beam 234 in FIG. 16 for severing (deleting) one of the conductive shunts 206, shown in FIG. 12, between the read pads 104 and 106. FIG. 17 shows that the laser beam 234 traverses across the conductive shunt and FIG. 18 shows the conductive shunt 206 severed so as to break the short between the first and second read pads 104 and 106. A complete description of the laser severing as well as other matters are described in commonly assigned U.S. Pat. No. 5,759,428 which is incorporated by reference herein.

Figure 19A:
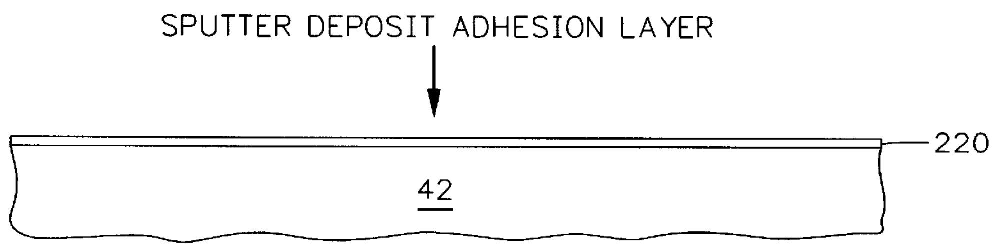
FIGS. 19A–19L are side views of a sequence of steps in the construction of the conductive seed layer, the pads and a conductive shunt between the read pads.
Figure 19B:
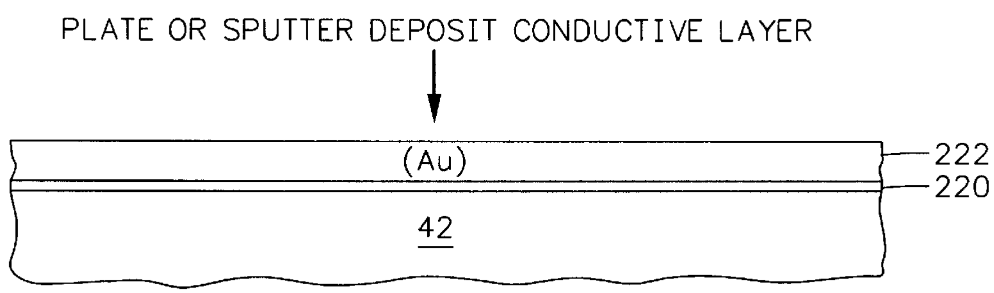
Figure 19C:
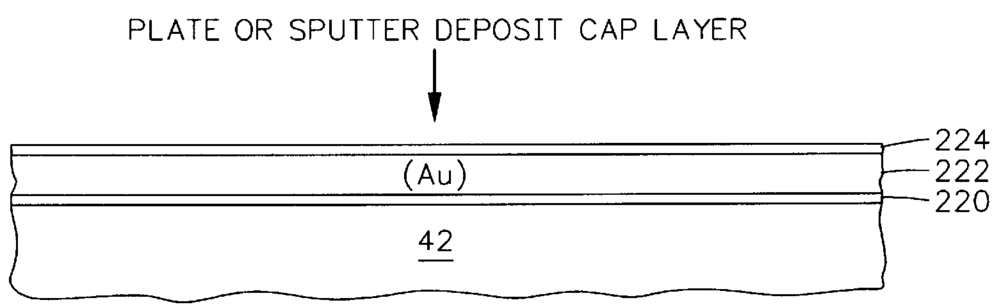
Figure 19D:
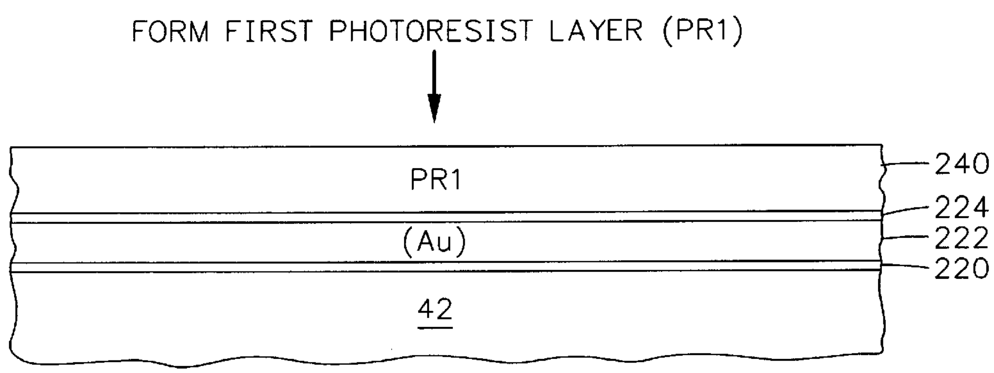
Figure 19E:
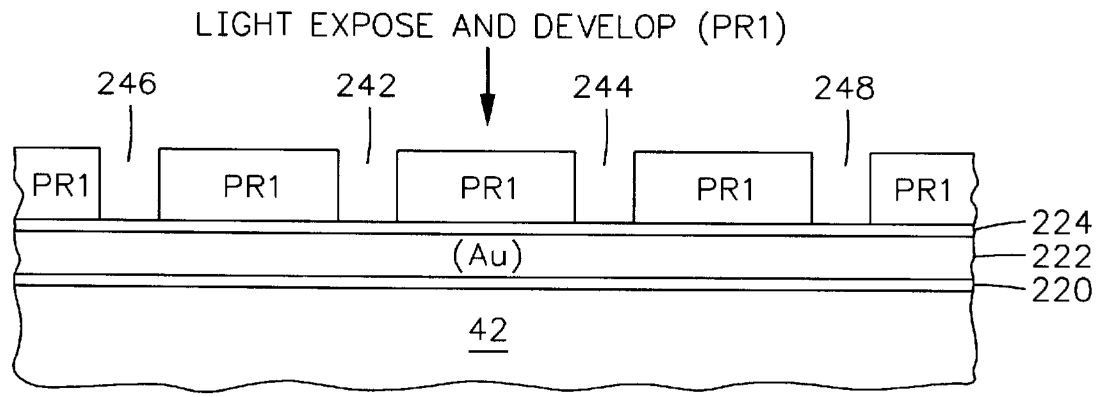
Figure 19F:
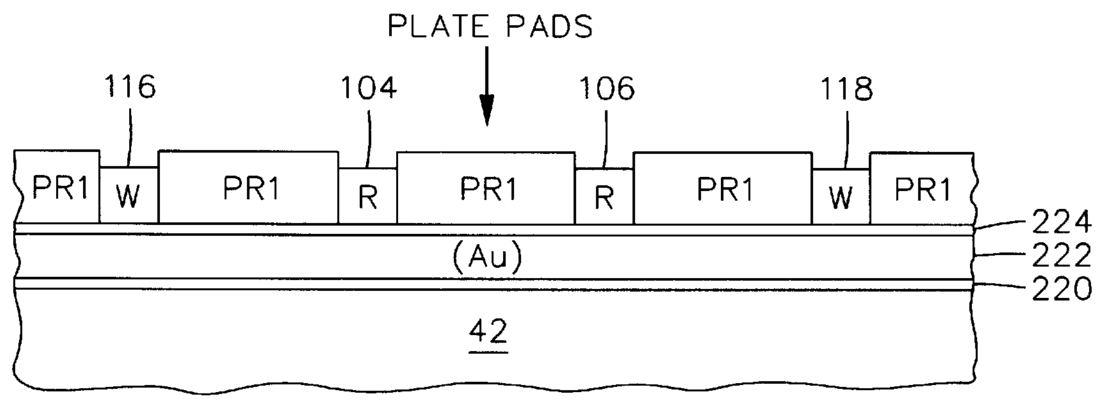
Figure 19G:
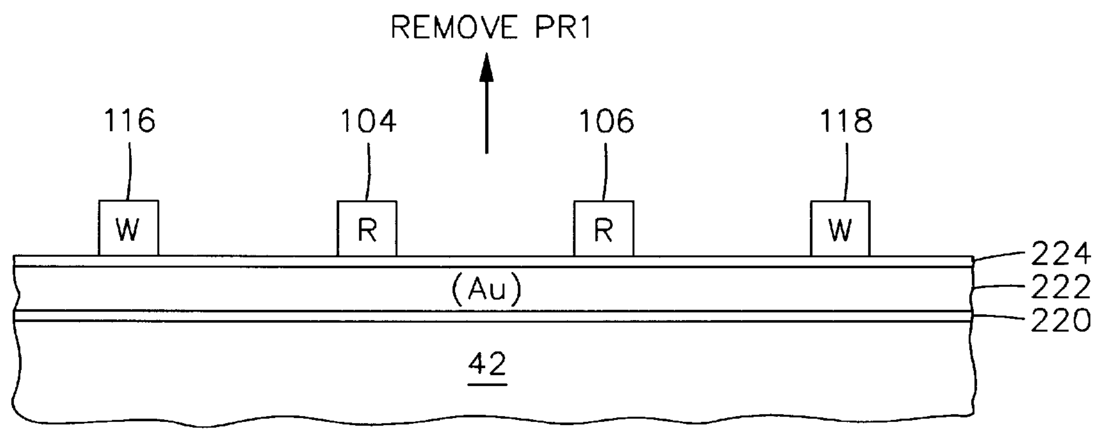
Figure 19H:
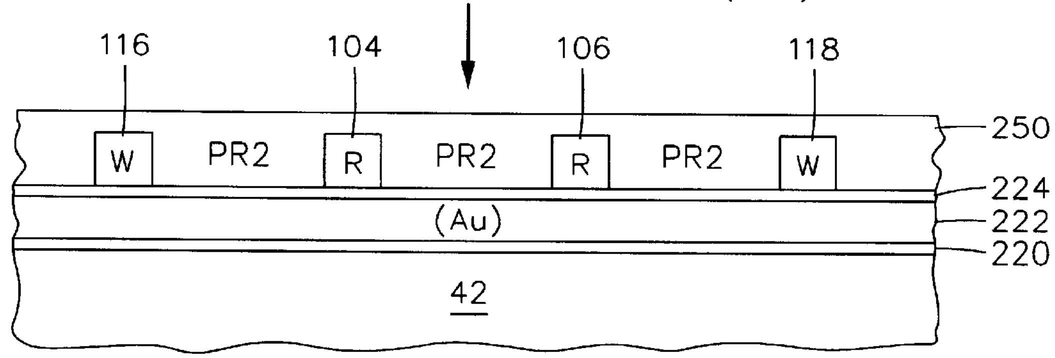
Figure 19I:
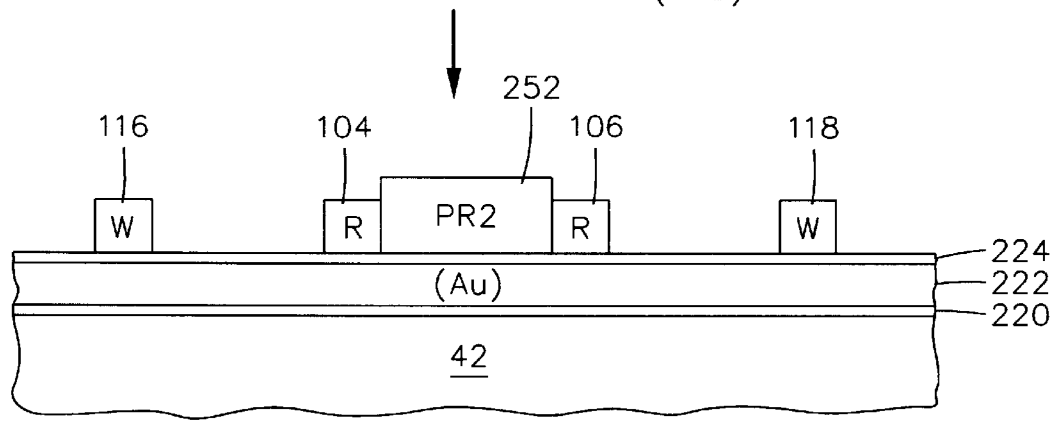
Figure 19J:
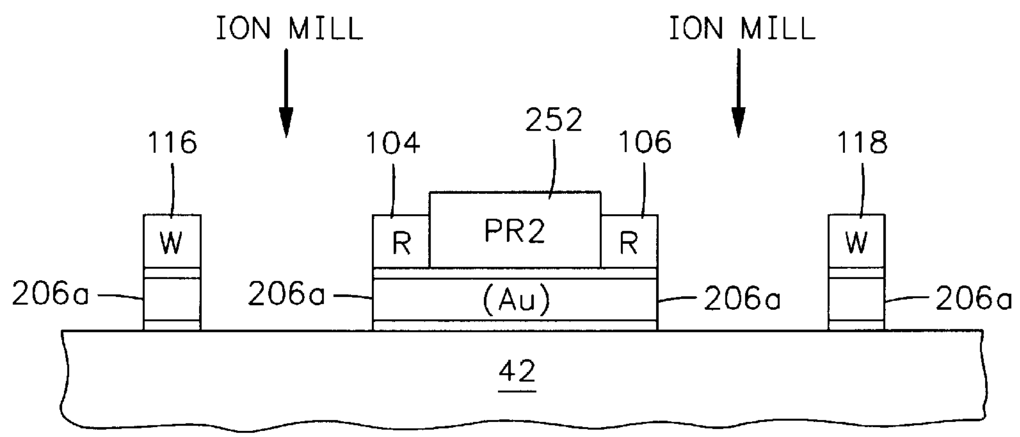
Figure 19K:
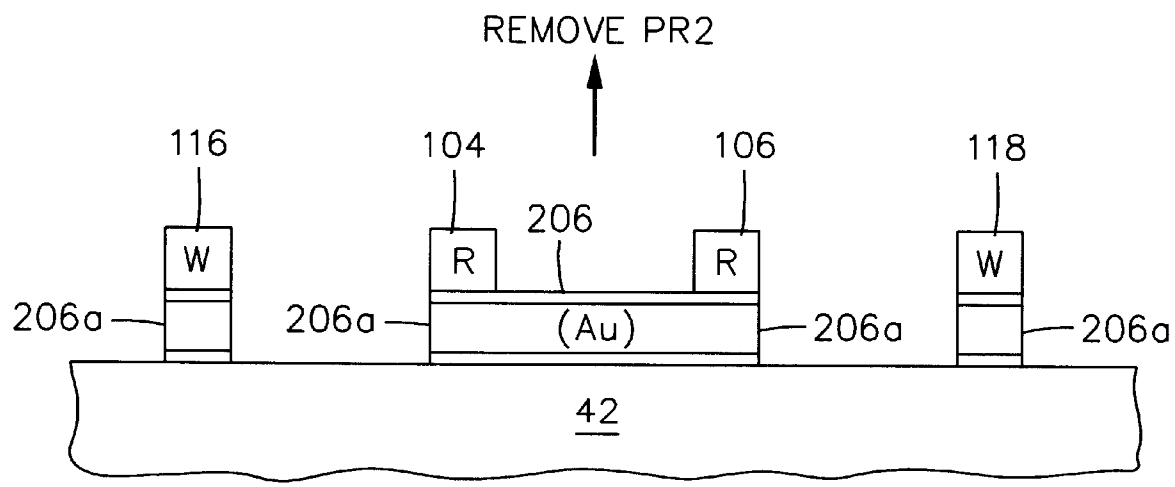
Figure 19L:
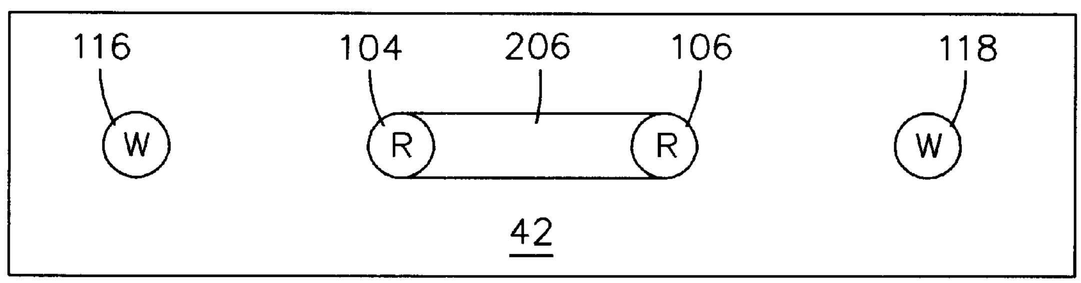

Method of the Invention FIGS. 19A–19L illustrate a sequence of steps in the construction of the read and write pads and the conductive shunts 206 on the wafer 200 in FIG. 10, however the construction of only the read and write pads and the conductive shunt for one slider is illustrated in FIGS. 19A–19L. In FIG. 19A the adhesion layer 220 is sputter deposited on the slider 42. The adhesion layer 220 provides a conductive seed layer so that the conductive layer 222 can be plated on the adhesion layer or the conductive layer 222 can be sputter deposited on the adhesion layer, as shown in FIG. 19B. The conductive layer 222 then provides a seed layer for plating the cap layer 224 or the cap layer 224 can be sputter deposited on the conductive layer, as shown in FIG. 19C. In FIG. 19D a first photoresist layer (PRI) 240 is spin coated on top of the cap layer 224. In FIG. 19E the first photoresist layer (PRI) is light exposed and developed to form first, second, third and fourth openings 242, 244, 246 and 248 down to the cap layer 224. The exposed portions of the cap layer 224 provide a seed layer so that the first and second read pads 104 and 106 and first and second write pads 116 and 118 can be plated in the openings 242, 244, 246 and 248, as shown in FIG. 19F. In FIG. 19G the first photoresist layer (PRI) is removed. In FIG. 19H a second photoresist layer (PR2) 250 is spin coated on the wafer to cover the cap layer 224. In FIG. 191 the second photoresist layer 250 is light exposed and developed leaving a portion 252 of the second photoresist layer covering the cap layer 224 between the first and second read pads 104 and 106. In FIG. 19J ion milling is implemented to remove all portions of the cap layer 224, the conductive layer 222 and the adhesion layer 220 except that masked by the photoresist portion 252 and covered by the pads 104, 106, 116 and 118. In FIG. 19K the portion 252 of the second photoresist layer is removed which provides the same structure as that shown in FIG. 13. FIG. 19L is a top view of FIG. 19K.

Clearly, other embodiments and modifications of this invention will occur readily to those of ordinary skill in the art in view of these teachings. Therefore, this invention is to be limited only by the following claims, which include all such, embodiments and modifications when viewed in conjunction with the above specification and accompanying drawings.

We claim:

1. A magnetic head assembly comprising:

a slider that has an air bearing surface (ABS);

a read head carried by the slider and forming a portion of the ABS so as to be capable of facing a magnetic medium for receiving field signals therefrom;

the read head having a sensor for sensing said field signals;

first and second leads connected to the sensor and extending within the slider to spaced apart first and second lead ends at an exterior surface of the slider;

a multilayer electrically conductive shunt located on said exterior surface in electrical contact with each of the first and second lead ends and extending therebetween;

electrically conductive spaced apart first and second read pads located on the conductive shunt and in electrical contact with said first and second lead ends via said conductive shunt;

said conductive shunt including:

a non-aniosotropic magnetoresistive (non-AMR) adhesion layer on and interfacing said exterior surface of the slider;

a non-AMR electrically conductive layer on and interfacing the adhesion layer; and the conductive layer being thicker and being a greater electrical conductivity material than the adhesion layer.

2. A magnetic head assembly as claimed in claim 1 wherein the conductive shunt is totally severed between said first and second read pads.

3. A magnetic head assembly as claimed in claim 1 wherein the conductive shunt further includes:

a cap layer on and interfacing the conductive layer; and the cap layer being thicker and being a higher resistance material than the conductive layer.

4. A magnetic head assembly as claimed in claim 3 wherein the adhesion layer is tantalum (Ta) or chromium (Cr) and the conductive layer is gold (Au).

5. A magnetic head assembly as claimed in claim 4 wherein the cap layer is nickel iron chromium (NiFeCr) or rhodium (Rh).

6. A magnetic head assembly as claimed in claim 1 including:

a write head carried by the slider and forming a portion of the ABS so as to be capable of facing a magnetic medium for writing magnetic signals therein; and third and fourth leads connected to the write head and extending within the slider to spaced apart third and fourth lead ends at said exterior surface of the slider.

7. A magnetic head assembly as claimed in claim 6 wherein the conductive shunt further includes:

a cap layer on and interfacing the conductive layer; and the cap layer being thinner and being a higher resistance material than the conductive layer.

8. A magnetic head assembly as claimed in claim 7 wherein:

the adhesion layer is tantalum (Ta) or chromium (Cr) and the conductive layer is gold (Au); and the cap layer is nickel iron chromium (NiFeCr) or rhodium (Rh).

9. A magnetic head assembly as claimed in claim 8 wherein the conductive shunt is totally severed between said first and second read pads.

10. A magnetic head assembly having an air bearing surface (ABS), comprising:

a write head including:

ferromagnetic first and second pole piece layers that have a yoke portion located between a pole tip portion and a back gap portion;

a nonmagnetic write gap layer located between the pole tip portions of the first and second pole piece layers;

an insulation stack with at least one coil layer embedded therein located between the yoke portions of the first and second pole piece layers; and the first and second pole piece layers being connected at their back gap portions;

a read head including:

a spin valve sensor;

nonmagnetic electrically nonconductive first and second read gap layers;

the spin valve sensor being located between the first and second read gap layers;

a ferromagnetic first shield layer; and the first and second gap layers being located between the first shield layer and the first pole piece layer; and a slider forming said air bearing surface (ABS);

the read head being carried by the slider and forming a portion of the ABS so as to be capable of facing a magnetic medium so that the sensor can receive field signals therefrom;

first and second leads connected to the sensor and extending within the slider to spaced apart first and second lead ends at an exterior surface of the slider;

a multilayer electrically conductive shunt located on said exterior surface in electrical contact with each of the first and second lead ends and extending therebetween;

electrically conductive spaced apart first and second read pads located on the conductive shunt and in electrical contact with said first and second lead ends via said conductive shunt;

the write head being carried by the slider and forming a portion of the ABS so as to be capable of facing the magnetic medium for writing magnetic signals therein;

third and fourth leads connected across the write head and extending within the slider to spaced apart third and fourth lead ends at said exterior surface of the slider;

said conductive shunt including:

a non-anisotropic magnetoresistive (non-AMR) adhesion layer on and interfacing said exterior surface of the slider;

a non-AMR electrically conductive layer on and interfacing the adhesion layer; and the conductive layer being thicker and being a greater electrical conductivity material than the adhesion layer.

11. A magnetic head assembly as claimed in claim 10 wherein the conductive shunt is totally severed between said first and second read pads.

12. A magnetic head assembly as claimed in claim 10 wherein the conductive shunt further includes:

a cap layer on and interfacing the conductive layer; and the cap layer being thinner and having a higher resistance material than the conductive layer.

13. A magnetic head assembly as claimed in claim 12 wherein:

the adhesion layer is tantalum (Ta) or chromium (Cr) and the conductive layer is gold (Au); and the cap layer is nickel iron chromium (NiFeCr) or rhodium (Rh).

14. A magnetic head assembly as claimed in claim 13 wherein the conductive shunt is totally severed between said first and second read pads.

15. A magnetic disk drive including at least one magnetic head assembly that has an air bearing surface (ABS) and that includes a write head and a read head, comprising:

the write head including:

ferromagnetic first and second pole piece layers that have a yoke portion located between a pole tip portion and a back gap portion;

a nonmagnetic write gap layer located between the pole tip portions of the first and second pole piece layers;

an insulation stack with at least one coil layer embedded therein located between the yoke portions of the first and second pole piece layers; and the first and second pole piece layers being connected at their back gap portions; the read head including:

a spin valve sensor;

nonmagnetic electrically nonconductive first and second read gap layers;

the spin valve sensor being located between the first and second read gap layers;

a ferromagnetic first shield layer; and the first and second gap layers being located between the first shield layer and the first pole piece layer; and a slider forming said air bearing surface (ABS);

the read head being carried by the slider and forming a portion of the ABS so as to be capable of facing a magnetic medium so that the sensor can receive field signals therefrom;

first and second leads connected to the sensor and extending within the slider to spaced apart first and second lead ends at an exterior surface of the slider;

a multilayer electrically conductive shunt located on said exterior surface in electrical contact with each of the first and second lead ends and extending therebetween;

electrically conductive spaced apart first and second read pads located on the conductive shunt and in electrical contact with said first and second lead ends via said conductive shunt;

the write head being carried by the slider and forming a portion of the ABS so as to be capable of facing the magnetic medium for writing magnetic signals therein; and third and fourth leads connected across the write head and extending within the slider to spaced apart third and fourth lead ends at said exterior surface of the slider;

said conductive shunt including:

a non-aniosotropic magnetoresistive (non-AMR) adhesion layer on and interfacing said exterior surface of the slider;

a non-AMR electrically conductive layer on and interfacing the adhesion layer;

the conductive layer being thicker and being a greater electrical conductivity material than the adhesion layer;

a housing;

a magnetic disk rotatably supported in the housing;

a support mounted in the housing for supporting the magnetic head assembly with said ABS facing the magnetic disk so that the magnetic head assembly is in a transducing relationship with the magnetic disk;

a spindle motor for rotating the magnetic disk;

an actuator positioning means connected to the support for moving the magnetic head assembly to multiple positions with respect to said magnetic disk; and a processor connected to the magnetic head assembly, to the spindle motor and to the actuator for exchanging signals with the magnetic head assembly, for controlling movement of the magnetic disk and for controlling the position of the magnetic head assembly.

16. A magnetic disk drive as claimed in claim 15 wherein the conductive shunt is totally severed between said first and second read pads.

17. A magnetic disk drive as claimed in claim 15 wherein the conductive shunt further includes:

a cap layer on and interfacing the conductive layer; and the cap layer being thinner and being a higher resistance material than the conductive layer.

18. A magnetic disk drive as claimed in claim 17 wherein:

the adhesion layer is tantalum (Ta) or chromium (Cr) and the conductive layer is gold (Au); and the cap layer is nickel iron chromium (NiFeCr) or rhodium (Rh).

19. A magnetic disk drive as claimed in claim 18 wherein the conductive shunt is totally severed between said first and second read pads.

20. A method of making a magnetic head assembly comprising the steps of:

forming a slider that has an air bearing surface (ABS);

forming the slider with a read head so that the read head forms a portion of the ABS so as to be capable of facing a magnetic medium for receiving field signals therefrom;

forming the read head with a sensor for sensing said field signals;

connecting first and second leads to the sensor and extending them within the slider to spaced apart first and second lead ends at an exterior surface of the slider;

forming a multilayer electrically conductive shunt on said exterior surface in electrical contact with each of the first and second lead ends and extending it therebetween;

forming electrically conductive spaced apart first and second read pads on the conductive shunt and in electrical contact with said first and second lead ends via said conductive shunt;

forming said conductive shunt including the steps of:

forming a non-aniosotropic magnetoresistive (non-AMR) adhesion layer on and interfacing said exterior surface of the slider;

forming a non-AMR electrically conductive layer on and interfacing the adhesion layer; and forming the conductive layer thicker and of a greater electrical conductivity material than the adhesion layer.

21. A method as claimed in claim 20 including severing the shunt between said first and second read pads.

22. A method as claimed in claim 20 wherein the conductive shunt further formed comprising the steps of:

forming a cap layer on and interfacing the conductive layer; and forming the cap layer thinner and of a higher resistance material than the conductive layer.

23. A method as claimed in claim 22 wherein:

the adhesion layer is formed of tantalum (Ta) or chromium (Cr) and the conductive layer is formed of gold (Au); and the cap layer is formed of nickel iron chromium (NiFeCr) or rhodium (Rh).

24. A method as claimed in claim 20 including:

forming the slider with a write head so that the write head forms a portion of the ABS so as to be capable of facing a magnetic medium for writing magnetic signals therein; and connecting third and fourth leads to the write head and extending them within the slider to spaced apart third and fourth lead ends at said exterior surface of the slider.

25. A method as claimed in claim 24 including severing the shunt between said first and second read pads.

26. A method as claimed in claim 24 wherein the conductive shunt further formed comprising the steps of:

forming a cap layer on and interfacing the conductive layer; and forming the cap layer thinner and of a higher resistance material than the conductive layer.

27. A method as claimed in claim 26 wherein:

the adhesion layer is formed of tantalum (Ta) or chromium (Cr) and the conductive layer is formed of gold (Au); and the cap layer is formed of nickel iron chromium (NiFeCr) or rhodium (Rh).

28. A method of making a magnetic head assembly having an air bearing surface (ABS), comprising the steps of:

forming a write head including the steps of:

forming ferromagnetic first and second pole piece layers that have a yoke portion located between a pole tip portion and a back gap portion;

forming a nonmagnetic write gap layer between the pole tip portions of the first and second pole piece layers;

forming an insulation stack with at least one coil layer embedded therein between the yoke portions of the first and second pole piece layers; and connecting the first and second pole piece layers at their back gap portions;

forming a read head including the steps of:

forming a spin valve sensor;

forming nonmagnetic electrically nonconductive first and second read gap layers with the spin valve sensor located between the first and second read gap layers; and forming a ferromagnetic first shield layer with the first and second gap layers located between the first shield layer and the first pole piece layer;

forming a slider that has an air bearing surface (ABS);

forming the slider with the read head so that the read head forms a portion of the ABS so as to be capable of facing a magnetic medium for receiving field signals therefrom;

forming the read head with a sensor for sensing said field signals;

connecting first and second leads across the sensor and extending them within the slider to spaced apart first and second lead ends at an exterior surface of the slider;

forming a multilayer electrically conductive shunt on said exterior surface in electrical contact with each of the first and second lead ends and extending it therebetween;

forming electrically conductive spaced apart first and second read pads on the conductive shunt and in electrical contact with said first and second lead ends via said conductive shunt;

forming said conductive shunt including the steps of:

forming a non-aniosotropic magnetoresistive (non-AMR) adhesion layer on and interfacing said exterior surface of the slider;

forming a non-AMR electrically conductive layer on and interfacing the adhesion layer; and forming the conductive layer thicker and of a greater electrical conductivity material than the adhesion layer.

29. A method as claimed in claim 28 including severing the shunt between said first and second read pads.

30. A method as claimed in claim 28 wherein the conductive shunt further formed comprising the steps of:

forming a cap layer on and interfacing the conductive layer; and forming the cap layer thinner and of a higher resistance material than the conductive layer.

31. A method as claimed in claim 30 wherein:

the adhesion layer is formed of tantalum (Ta) or chromium (Cr) and the conductive layer is formed of gold (Au); and the cap layer is formed of nickel iron chromium (NiFeCr) or rhodium (Rh).

32. A method of making a magnetic head assembly comprising the steps of:

forming a slider with a read head that has a sensor for sensing field signals from a magnetic medium;

forming first and second leads that connect to first and second ends respectively of the sensor and that extend from the sensor to an exterior surface of the slider where the first and second leads terminate in first and second lead ends respectively;

forming a shunt including the steps of:

forming a nonmagnetic metal adhesion layer on and interfacing said exterior surface of the slider and in electrical contact with the first and second lead ends; and forming an electrically conductive layer on the adhesion layer that is thicker and of a more electrically conductive material than the adhesion layer;

forming a first mask that has first and second openings down to the shunt for plating first and second read pads in electrical contact with said first and second lead ends;

plating said first and second read pads and removing the first mask;

forming a second mask covering the shunt between the first and second read pads and leaving exposed portions of the shunt therearound; and removing the exposed portions of the shunt.

33. A method as claimed in claim 32 further including the step of electrically severing the shunt between the first and second read pads.

34. A method as claimed in claim 32 wherein the shunt is further formed comprising the step of:

forming a cap layer on and interfacing the conductive layer wherein the cap layer is thinner and of a less conductive material than the conductive layer.

35. A method as claimed in claim 34 further including the step of electrically severing the shunt between the first and second read pads.

* * * * *